(12) United States Patent
Angelakos et al.

(10) Patent No.: US 10,599,594 B2
(45) Date of Patent: Mar. 24, 2020

(54) HIGH PERFORMANCE COMPUTING NETWORK

(71) Applicant: Nanotronix Inc., Wilmington, DE (US)

(72) Inventors: Evangelos Angelakos, Athens (GR); Konstantinos Masselos, Athens (GR)

(73) Assignee: Nanotronix Inc., Wilmington, DE (US)

(*) Notice: Subject to any disclaimer, the term of this patent is extended or adjusted under 35 U.S.C. 154(b) by 0 days.

(21) Appl. No.: 16/309,762

(22) PCT Filed: Jun. 15, 2017

(86) PCT No.: PCT/EP2017/064701
§ 371 (c)(1),
(2) Date: Dec. 13, 2018

(87) PCT Pub. No.: WO2017/216305
PCT Pub. Date: Dec. 21, 2017

(65) Prior Publication Data
US 2019/0138471 A1    May 9, 2019

(30) Foreign Application Priority Data
Jun. 15, 2016  (GB) .................................. 1610430.9

(51) Int. Cl.
*G06F 13/20*      (2006.01)
*G06F 15/173*     (2006.01)
*G06F 13/42*      (2006.01)

(52) U.S. Cl.
CPC .......... *G06F 13/20* (2013.01); *G06F 13/4282* (2013.01); *G06F 15/17375* (2013.01)

(58) Field of Classification Search
CPC . G06F 13/20; G06F 13/4282; G06F 15/17375
See application file for complete search history.

(56) References Cited

U.S. PATENT DOCUMENTS 7,733,125 B2 *   6/2010   Murotake ............. G06F 9/4401
                                                                  326/101
7,761,687 B2 *   7/2010   Blumrich .......... G06F 15/17337
                                                                   712/11

(Continued)

OTHER PUBLICATIONS

International Search Report and Written Opinion, International Patent Application No. PCT/EP2017/064701, dated Sep. 19, 2017.

(Continued)

*Primary Examiner* — Glenn A. Auve
(74) *Attorney, Agent, or Firm* — Saul Ewing Arnstein & Lehr LLP; Brian R. Landry

(57) ABSTRACT

The present invention relates to a method of processing data in a computer system, the method comprising the steps of: 1) allocating at least one processing node (100); 2) receiving data at a data source node (200, 400); 3) transferring the data to the or each processing node (100) through a serial data connection; 4) processing the data at the or each processing node (100); and 5) transferring the processed data from the or each processing node (100) to a data sink node (300, 400) through the serial data connection, wherein the at least one processing node (100), the data source node (200, 400) and the data sink (300, 400) each comprise no more than one Field Programmable Gate Array (101) or Application Specific Integrated Circuit.

20 Claims, 11 Drawing Sheets

(56) References Cited

U.S. PATENT DOCUMENTS

| | | | | |
|---|---|---|---|---|
| 8,250,133 B2* | 8/2012 | Blumrich | .................. | G06F 9/52 |
| | | | | 709/201 |
| 2005/0256969 A1* | 11/2005 | Yancey | ............... | G06F 13/4256 |
| | | | | 709/238 |
| 2008/0022932 A1 | 1/2008 | Rottier et al. | | |
| 2010/0157854 A1* | 6/2010 | Anderson | ............... | H04L 45/00 |
| | | | | 370/276 |
| 2011/0179456 A1* | 7/2011 | Bar-Niv | ................. | H04N 7/106 |
| | | | | 725/85 |
| 2016/0188340 A1* | 6/2016 | Fushimi | ................ | G06F 15/163 |
| | | | | 712/225 |

OTHER PUBLICATIONS

International Preliminary Report on Patentability, International Patent Application No. PCT/EP2017/064701, dated Dec. 27, 2018.

\* cited by examiner

HIGH PERFORMANCE COMPUTING NETWORK

CROSS-REFERENCE TO RELATED APPLICATIONS

This application is a national phase application under 35 U.S.C. 371 of International Application No. PCT/EP2017/064701, filed Jun. 15, 2017, which claims priority to United Kingdom Application No. 1610430.9, filed Jun. 15, 2016. The entire contents of each application is hereby incorporated by reference herein.

FIELD OF THE INVENTION

The present invention relates generally to a new computer architecture. More specifically, the invention relates to a nodal FPGA/ASIC based computer architecture.

BACKGROUND OF THE INVENTION

Conventional computing systems are based on Von Neumann or Harvard architectures. Both of these systems rely on a Central Processing Unit (CPU) to direct any processes occurring within the system. For the better part of the last four decades, computing, scaling from personal to datacenter sized systems, has evolved around a CPU-centric motherboard, with everything else intended for data processing or storage, operating in the periphery of the CPU. This kind of centralisation has made CPU task-sharing (or multitasking) a necessity, introducing management complexities in modern operating systems and programming models, further causing important software overheads and limitations in per-task execution granularity and task-completion determinism to be considered as acceptable trade-offs. These later characteristics have also generated a schism among computing hardware designed for general use and hardware designed for data acquisition, control automation or other applications in need for real-time and predictable handling of computing loads. These CPU-centric computer architectures are heavily focussed on CPUs directing all processes within the computer and, as such, the system's processing speed is limited, in part, by the speed of the CPU. Furthermore such CPU centric computer architectures adopt an instruction driven computing approach following the traditional instruction fetch—decode—execute cycle that introduces significant power/energy overheads.

To address these challenges, more execution cores have been added to CPUs, for better handling of multitasking. Also non-CPU related hardware has been introduced for data handling and processing. This hardware has taken the form of graphics processors, expansion-bus interfaces and memory controllers integrated in modern CPUs, making them highly complicated Systems-on-Chip (SoC), while always remaining aligned to the general architectural principle of a CPU-centric motherboard system.

Even though this kind of integration has made low-power and mobile computing possible, it hasn't provided a realistic path forward for data centre and industrial scale computing which, contrary to mobile computing and, in part, in order to complement it by (cloud) abstraction, has had to grow and adapt to handling extremely diverse, complex and always evolving sets of computing loads in the most power efficient way.

At the same time, owing to the same technological advances that make complex, billion transistor CPUs possible, other, non-CPU computing components, in the form of Field Programmable Gate Arrays (FPGAs) and their non-reprogrammable Hardware Description language (HDL) counterparts: the Application Specific Integrated Circuits (ASICs), have grown in performance and efficiency too. Today's FPGAs come with unprecedented logic densities, clock speed and power efficiencies, while maintaining the benefit of being hardware level re-programmable (in interconnect level) in the field. The importance of these characteristics is best evidenced by the industry scale paradigm shift towards synthesisable hardware and the wide availability and commercial adoption of HDL/Intellectual Property cores (IP cores) set to address general purpose or specific (Graphics, DSP etc.) processing problems using FPGAs and ASICs.

FPGAs/ASICs, combined with mature HDL/IP cores, have reached performance levels that currently outperform CPUs in power, utilisation efficiency and sometimes even in raw computing performance. However, due to the CPU/Motherboard-centric model of current computer architecture, FPGAs/ASICs remain on the periphery of computing hardware, limited mostly to offering acceleration and offloading services to the CPU.

High speed backplane/board-to-board interconnects (such as ISA, EISA, AGP, PCI and, more recently, PCIe) are designed for interconnecting computing capable peripherals with CPUs in a CPU-based computer architecture. Present implementations of FPGA/ASIC based computing hardware use PCIe interconnects to interface with the CPU and other critical, motherboard hosted, computing resources like memory and network interface controllers. However, these interconnects impose physical limitations to scaling (as interconnection points are limited by the size of the motherboard), and lack the mechanisms for supporting peer importance component interaction (such as uniform access to memory), introducing further constrains in resource accessibility and combined resource utilisation.

In such an arrangement, memory subsystems are not only used for facilitating data storage and retrieval, but also act as intermediate interfaces for heterogeneous computing hardware operating on a given set of data. Typically, a piece of data processed by a CPU, even when it is known that it will be passed to another computing element for further downstream processing (e.g. GPU or FPGA/ASIC), will need to temporarily reside in memory and be read back by the next processing element. Ideally, but not always, this process will run with the CPU handing over memory control to the further processing element for accessing the memory directly (via direct memory access (DMA)), even though memory controller integration in modern (SoC) CPUs is blurring this line, and the extensive use of caching further raises various challenges on data coherence, synchronisation and avoiding performance penalties over such a transaction.

Attaching FPGAs/ASICs as peripheral equipment to CPU-centric computing systems hinders their performance and limits their importance in modern computing. FPGAs/ASICs are designed, at component and even internal circuitry level, to operate extremely efficiently in parallel while scale in numbers, but attachment points available to CPU-based systems, typically through expansion boards over PCIe slots, are very limited. This forces extensive hardware multiplexing, which does not permit efficient parallelization or scaling, to be used in order to orchestrate operation:

many FPGA/ASIC carrying expansion boards are multiplexed over the limited PCIe lanes available to the CPU (CPU motherboard level multiplexing);

many FPGA/ASICs, at expansion board level, are multiplexed over the PCIe lanes assigned to each expansion board.

Such systems are complex to build and program, as well as power inefficient to run.

The present invention aims to reduce restrictions set by CPU-centric computing.

SUMMARY OF THE INVENTION

According to a first aspect of the present invention, a method of processing data in a computer system is provided. The method comprises the steps of: allocating at least one processing node; receiving data from a data source node; transferring the data to the or each processing node through a serial data connection; processing the data at the or each processing node; and transferring the processed data from the or each processing node to a data sink node through the serial data connection, wherein the at least one processing node, the data source node and the data sink each comprise no more than one Field Programmable Gate Array or Application Specific Integrated Circuit.

In one example of the first aspect, individual processing nodes within the system are arranged to communicate data via Ethernet interconnects. Nodes are daisy-chained together such that, if the data cannot be processed in series by a node at a required speed, further nodes are enlisted to process excess data in parallel until the processing is occurring at the required speed. In this manner, data can be processed in series as a pipelined multi-stage process (task level parallelism), in parallel (data level parallelism) to achieve higher processing speed, or as a combination of the two.

The serial data connection may be an Ethernet connection. The data may be transferred in a path which alternates between the Ethernet connection and the nodes. The data may be transferred and processed in a non-blocking architecture. This allows the data to be processed at the highest possible speeds within the system. The data may also be transferred using direct memory access. The data may also be transferred without race condition and with a direct access path. This provides the advantage of minimising processing delays and removing the need for intermediary buffers or caches. The or each processing node may comprise a microcontroller. The microcontroller may comprise a serial data port. This allows control signals to be sent to a node separate from data signals. The serial data port may be an Ethernet port. The data sink node and/or the data source node may comprise discrete memory arranged to store data. The data source node may comprise an analogue to digital converter to convert analogue signals to digital data for processing. The data sink may comprise a digital to analogue converter arranged to convert the processed digital data back into analogue signals.

According to a second aspect of the invention, a node comprises: a Field Programmable Gate Array (FPGA) or an Application Specification Integrated Circuit (ASIC); a serial data port; and a serial data transceiver forming a connection between the FPGA and the serial data port, wherein the node is arranged to communicate with other devices through the serial data port, further wherein the node comprises no more than one FPGA or ASIC.

The serial data port may be an Ethernet port. The objective is for the data to be transferred in a path which alternates between the Ethernet connection and the nodes. The node may be arranged to communicate with other devices using a non-blocking architecture. The node may be further arranged to communicate with other devices using direct memory access. The node may be further arranged to communicate with other devices without race condition and with a direct access path. The node may further comprise a digital to analogue converter or an analogue to digital converter. This allows the system to operate uniformly on analogue or native digital data. The node may further comprise discrete memory. This allows the node to store data for retrieval by a node or by a conventional computer. The node may further comprise a microcontroller unit. The microcontroller unit may further comprise a serial data port. The serial data port may be an Ethernet port. The node may further comprise a power management integrated circuit.

According to a third aspect of the invention a computer architecture system comprises: a data source node; a plurality of processing nodes; and a data sink node, wherein the plurality of processing nodes, the data source node and the data sink node are arranged to communicate through a serial data connection and wherein the system is further arranged to perform the steps of: allocating at least one processing node of the plurality of processing nodes; receiving data from the data source node; transferring the data to the or each processing node through at least one serial data connection; processing the data at the or each processing node; and transferring the processed data from the or each processing node to the data sink node through the serial data connection, further wherein the plurality of processing nodes, the data source node and the data sink each comprise no more than one Field Programmable Gate Array or Application Specific Integrated Circuit.

As will be appreciated, the present invention provides several advantages over the prior art by restricting the component architecture to maintaining one FPGA per node and then serially interconnecting the nodes. For example the scalability of the system allows for a potentially unlimited number of nodes, or boards, to be introduced to the system, while hardware deployment can progressively scale with performance demand. In this manner, any single system can scale up to meet the requirements of any processing task, avoiding simultaneous single points of failure, especially in complex systems and ensuring a high degree of fault tolerance. Further, simpler and lower cost individual nodes/boards can be daisy-chained to provide the same processing power as higher cost equivalents thus allowing fine grain control of allocated hardware resources. Furthermore, the architecture of the present invention creates a highly deterministic operational framework for generic computing and data acquisition or real-time computing applications, with processing being effectively limited by the speed at which data can be transferred between nodes.

The serial data port may be an Ethernet port. The data may be transferred in a path which alternates between the Ethernet links and the nodes. The plurality of processing nodes, the data source node and the data sink node may be further arranged to communicate as a non-blocking architecture. The plurality of processing nodes, the data source node and the data sink node may be further arranged to communicate using direct memory access. The plurality of processing nodes (100), the data source node (200, 400) and the data sink node (300, 400) may be further arranged to communicate without race condition and with a direct access path. The data source node may comprise an analogue to digital converter. The data sink node may comprise a digital to analogue converter. The data source node and/or the data sink node may comprise discrete memory. The plurality of processing nodes, the data source node and the data sink node may comprise a microcontroller unit. The microcontroller unit may comprise an Ethernet port. The plurality of processing nodes, the data source node and the data sink node may comprise a power management integrated circuit. The system may further comprise an Ethernet switch.

BRIEF DESCRIPTION OF THE DRAWINGS

Other advantages and benefits of the present invention will become apparent from a consideration of the following description and accompanying drawings, in which.

DETAILED DESCRIPTION OF EXEMPLARY EMBODIMENTS

Figure 1:
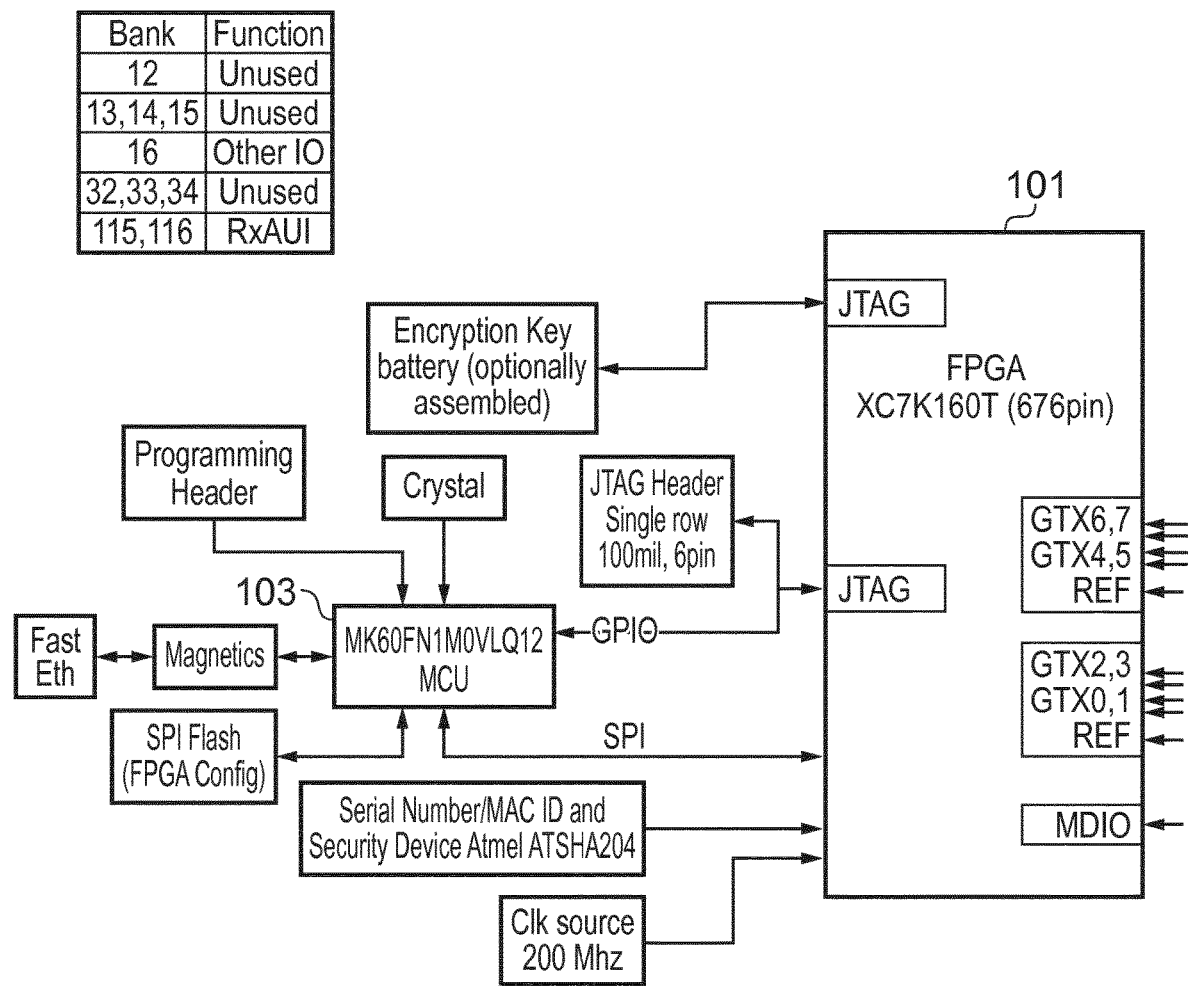
FIG. 1 is a structural diagram of a node of the present invention.
Figure 1:
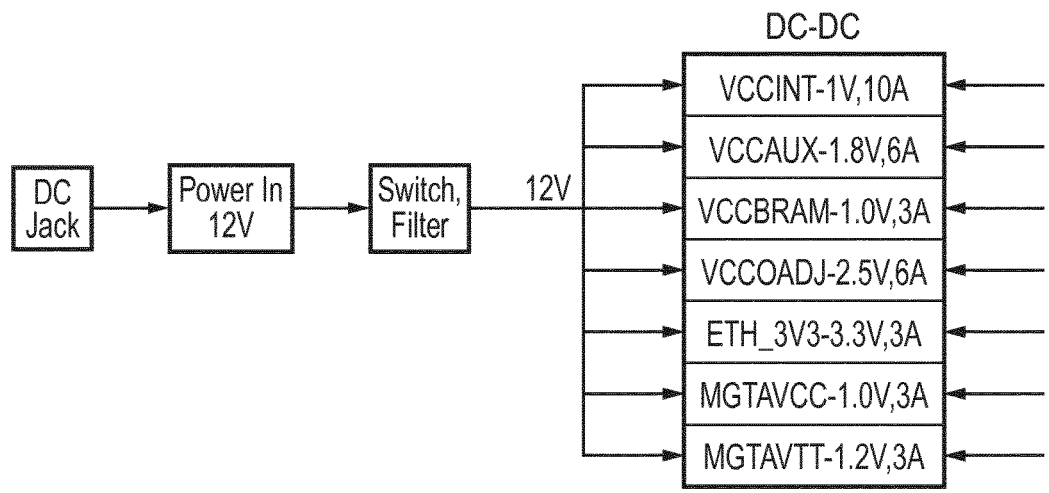
Figure 1:
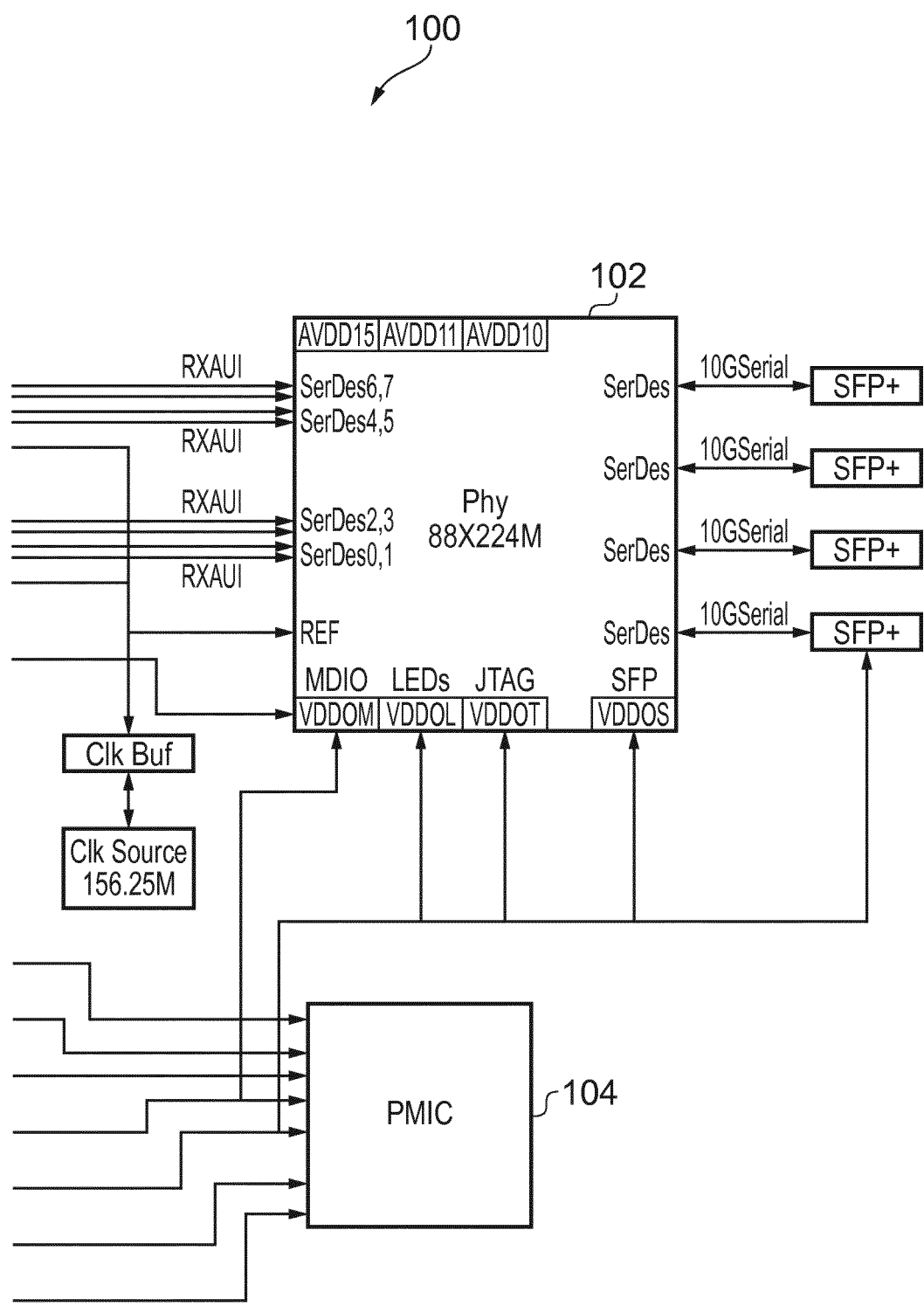

As the processing capabilities and power efficiency of FPGAs and ASICs increase, their use in computer systems is becoming more common. In this manner, an FPGA/ASIC based acceleration board is connected to a CPU-centric motherboard, usually within a client or server computer, for offloading computationally intensive parts of an application from the CPU, or for real-time processing of data intended for data acquisition and machine automation. FPGAs/ASICs are connected to the CPU through high-speed backplanes or board-to-board interconnects, e.g. PCI Express (PCIe), as expansion boards. This kind of interfacing introduces hard architectural constraints on scalability.

Connection through a PCIe bus is an attractive choice for tightly coupled accelerators due to its high throughput capacity. However PCIe is a complicated and expensive interconnect technology. Furthermore because there is no standard host-FPGA communication library, FPGA developers have to write significant amounts of PCIe related hardware description language (HDL) code at the FPGA side. They also have to create special software code (e.g., drivers, communication functions) at the host computer side in order to use those FPGA accelerators.

The physical dimensions of a motherboard (form factor) allow only a limited number of PCIe slots to be available. Even on server size motherboards, PCIe slots are limited to eight or less. Additionally, since PCIe is generally used for interconnecting peripherals to the CPU, the CPU has a limited number of PCIe lanes, further confining interconnection options. On high-end server CPUs, typically no more than 16 PCIe lanes are available per CPU. Taking into account that FPGA/ASIC boards typically consume 8 PCIe lanes per board, one can see the scalability challenges of the given architectural design.

Solutions for easing these restrictions involve multiplexing PCIe lanes, or using motherboards capable of hosting more than one CPU. However, the challenges and complexities of orchestrating the operation of such system are enormous and even if successful, the physical limitation of the number of PCIe slots still remains.

Incorporating powerful modern FPGA/ASICs as complementary units in a computing system, aside from hindering their potential impact in improving performance, introduces various limitations to their accessibility, both by hardware and software.

By developing system nodes around stand-alone FPGAs/ASICs and limiting their number (per node/board) to one FPGA/ASIC, the present invention allows a great amount of hardware, that would otherwise have to be spent on arbitrating shared resources and taking/releasing control over them, to be spared. All traffic directed to a node is intended for the FPGA/ASIC of that node and, in a deterministic way, travels a straight-forward path entering (through an Ethernet transceiver) and exiting (through the Ethernet transceiver) that FPGA/ASIC and the node/board in general.

The present invention introduces a scalable, Ethernet based architecture with optimised communication for computing acceleration using FPGAs/ASICs.

Furthermore the present invention allows, in principle an unlimited number of FPGA/ASIC based acceleration boards to be connected to a host Further, in terms of programming overheads, the present system requires simpler software to access offloading and acceleration hardware, as a network available resource, through Ethernet.

In an embodiment of the present invention, a computing system includes a number of nodes. each defined by a single board of a computing system, connected together by an Ethernet network, in this case a 10 Gigabit Ethernet network using a 10 Gigabit Ethernet switch. The 10 Gigabit Ethernet network and switch form a non-colliding Ethernet switching fabric which can support up to a large number of the nodes. The nodes can have different functions and arrangements. One type of node is an FPGA/ASIC processor node which carries out specific processing tasks. Another type of node is a data sink, which may be a storage node which stores data to discrete memory, or may use a Digital to Analogue Converter (DAC) to convert digital data to an analogue signal. Another type of node is a data source, which may be a storage node, which retrieves data from discrete memory, or may use an Analogue to Digital Converter (ADC) to convert analogue signals to digital data.

FIG. 1 shows a node 100 of the present invention, which comprises a Field Programmable Gate Array (FPGA) 101, a serial data transceiver 102, a microcontroller unit (MCU) 103 and a power management integrated circuit (PMIC) 104. The node 100 defines a single board of a computing system, such that each board of the system comprises only one FPGA.

The FPGA 101 is in data connection with the serial data transceiver 102 which, in a preferred embodiment, is an Ethernet data transceiver 102, but may also be some other form of serial data transceiver. The FPGA 101 is also in data connection with the MCU 103. Power is provided to the node 100 via the PMIC 104, which comprises a 12V DC-DC converter in order to provide power to the components of the node 100.

The FPGA 101 is the core of the node 100. The FPGA 101 is loaded with soft IP cores which determine the layout of its logic gates for performing functions on incoming data. The node 100 may be used as a processor, a data sink or a data source. If the node 100 is to be used as a data source or data sink carrying discrete memory, the FPGA 101 further comprises some means of attaching the memory, such as a small outline dual in-line memory module (SODIMM), or some other memory module. Alternatively, the node 100 may comprise an Application-Specific integrated circuit (ASIC), instead of an FPGA 101, capable of carrying out digital computations.

In a preferred embodiment, the FPGA 101 is a XILINX® 7 series FPGA. More specifically, the FPGA 101 is preferably one of: XC7K70T; XC7K160T; XC7K325T; or XC7K410T, although other FPGAs may be used. Preferably the FPGA 101 is a 676 pin package.

The Ethernet data transceiver 102 comprises four 10 GB Ethernet full duplex ports for receiving and transmitting data and control signals. The Ethernet data transceiver 102 sends the received data and control signals to the FPGA 101 for processing, storage or FPGA 101 control, depending on its configuration. If the FPGA 101 is arranged to act as a processor, once the data is processed, the FPGA 101 transfers the data back to the Ethernet data transceiver 102 to be transferred as directed. If the FPGA 101 is arranged to be used for storage, in its capacity as a data source, once the data is requested for retrieval from storage, the FPGA 101 transfers the data from the discrete memory or ADC to the Ethernet data transceiver 102 to be further transferred away from the node 100. If the FPGA 101 is arranged to be used for storage, in its capacity as a data sink, once the data is received, the data is transferred from the Ethernet data transceiver 102 to the discrete memory or DAC via the FPGA 101.

The Ethernet data transceiver 102 is preferably a Marvell® Alaska X multispeed Ethernet transceiver. More specifically, the Ethernet transceiver 102 is a 88×2242 quad-port transceiver, although other transceivers may be used.

The MCU 103 is used to address node management tasks, for example, node discovery, single and multi-node reservation and interconnect, status control, programming (IP core loading), synchronisation, triggering, debugging and booting of the FPGA 101, through its JTAG and SPO connections. The MCU 103 may further comprise an Ethernet port to be used exclusively for transmitting and receiving node 100 management information. In such an implementation, the FPGA 101 may exclusively receive data intended for processing through its Ethernet data transceiver 102, further supporting its deterministic and non-blocking operation. The MCU 103 boots the FPGA 101 with IP cores which are sent to the MCU 103 through a direct Ethernet connection at the MCU 103. The MCU 103 then loads the IP core directly on to the FPGA 101, and/or stores it to SPI flash to use when the FPGA 101 is powered on.

The IP cores determine the configuration of the logic blocks of the FPGA 101. Depending on the process to be performed by the FPGA 101, different IP cores are loaded onto the FPGA 101 to alter the gate configuration. For example, if the FPGA 101 is to offer memory-write functionality, a memory controller IP core may be used to direct data towards a SODIMM for storage. Alternatively, a different IP core may configure the FPGA 101 to carry out a specific processing task, such as encryption or decryption of incoming data, mathematic manipulation of incoming data or transfer of data to another node 100 through the Ethernet data transceiver 102. An Ethernet controller must always be present in the FPGA 101 loaded IP core to allow the FPGA 101 to interface, through the Ethernet data transceiver 102, with the Ethernet network.

The PMIC 104 is an intelligent DC-DC converter for generating the necessary voltages to power the various components of the node, as well as generating these voltages in a specified sequence for successfully 'booting' the node.

A node 100 of the structure described above allows multiple nodes 100, or boards, to be interconnected input-to-output in long processing chains capable of carrying out computational tasks.

Figure 2:
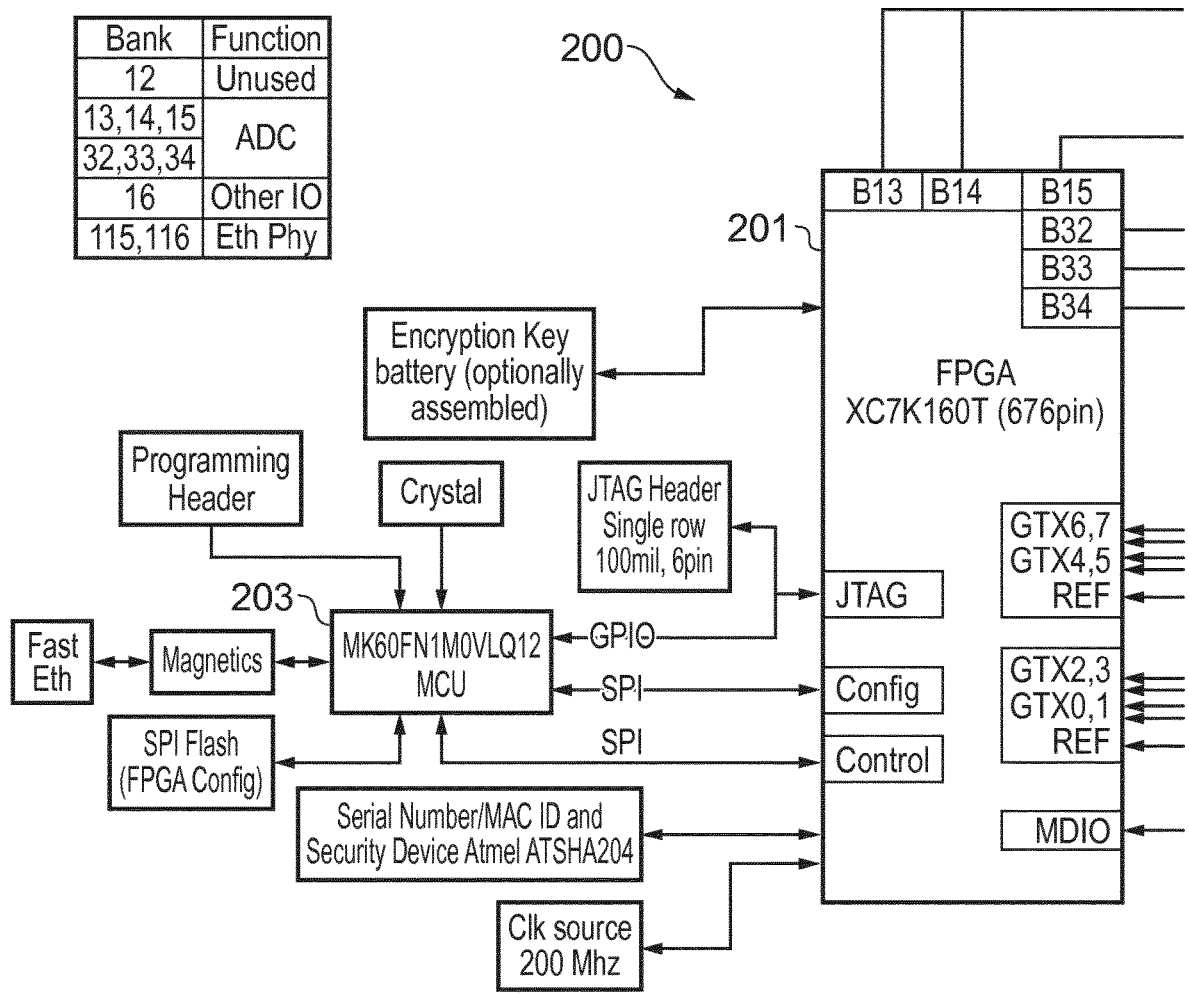
FIG. 2 is a structural diagram of an embodiment of a data source node.
Figure 2:
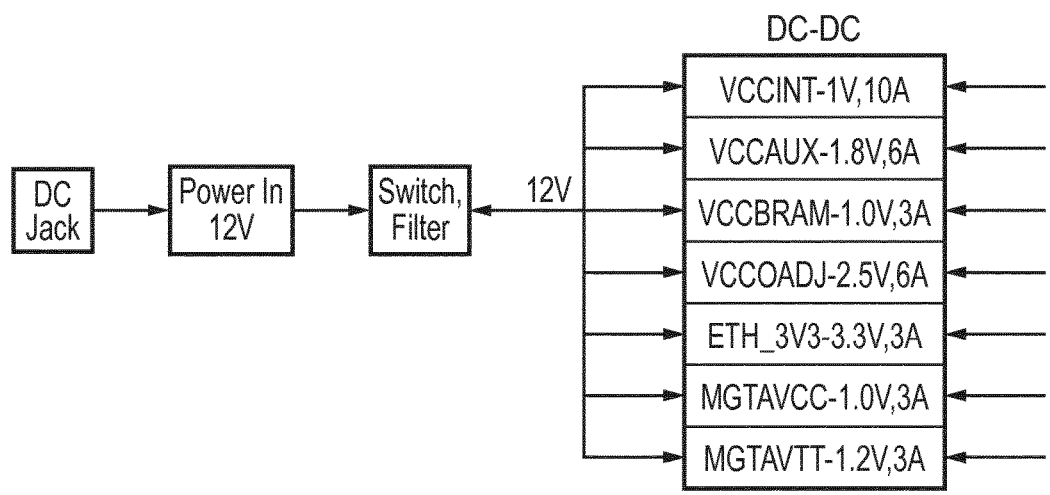
Figure 2:
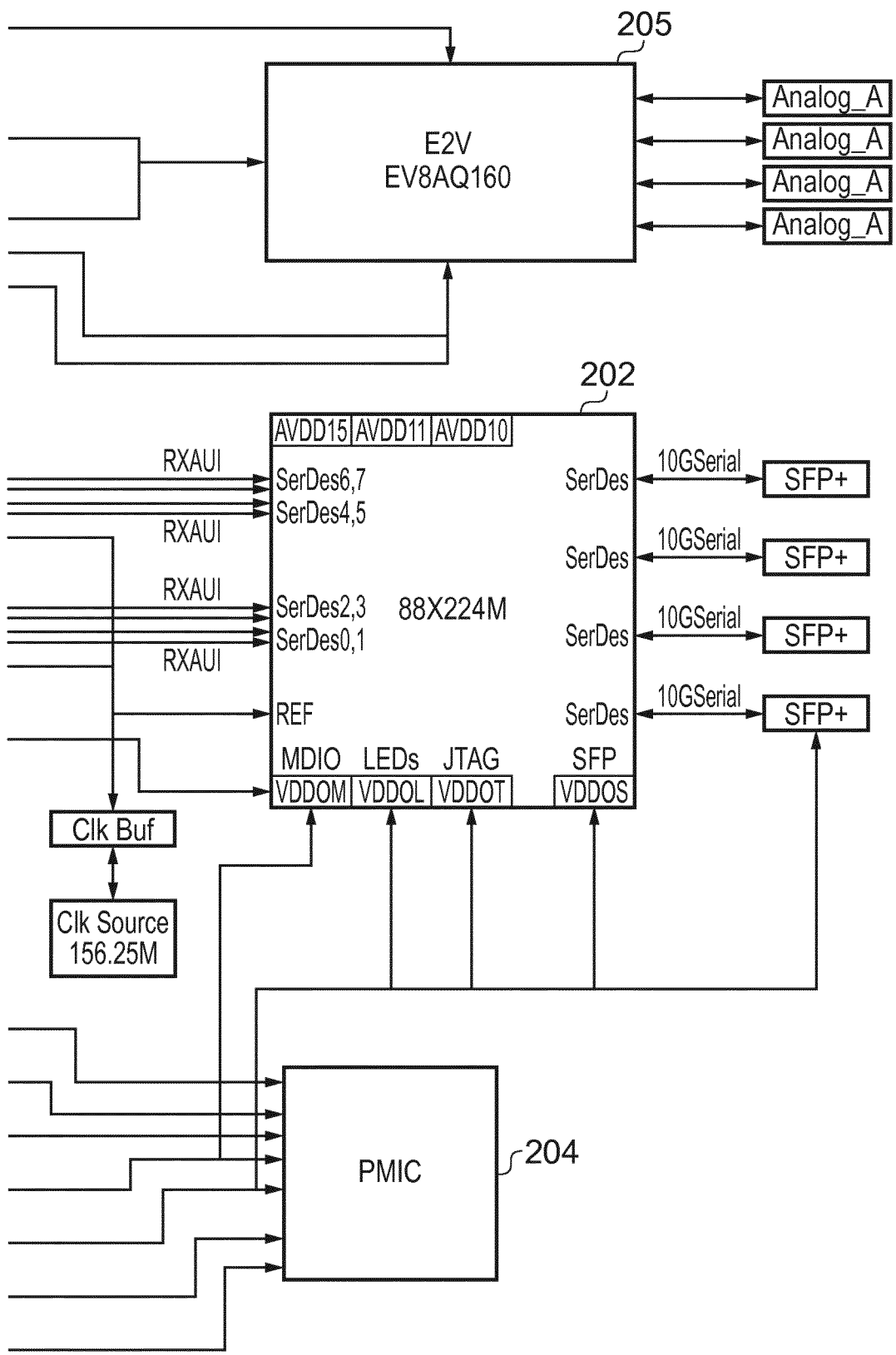

FIG. 2 shows the structure of a node 200 when it is being used as a data source with an ADC 205. The node 200 has the same structure as shown in FIG. 1 and so the description of FIG. 1 is not repeated here. However, in addition, the node 200 also comprises an ADC 205 in connection with the FPGA 201.

The ADC 205 is preferably an E2V Technologies® four channel, 8-bit 5.0 giga sample per second (5 GSps) ADC 205. More specifically, the ADC 205 is an EV8AQ160 ADC, although other ADCs may be used.

Figure 3:
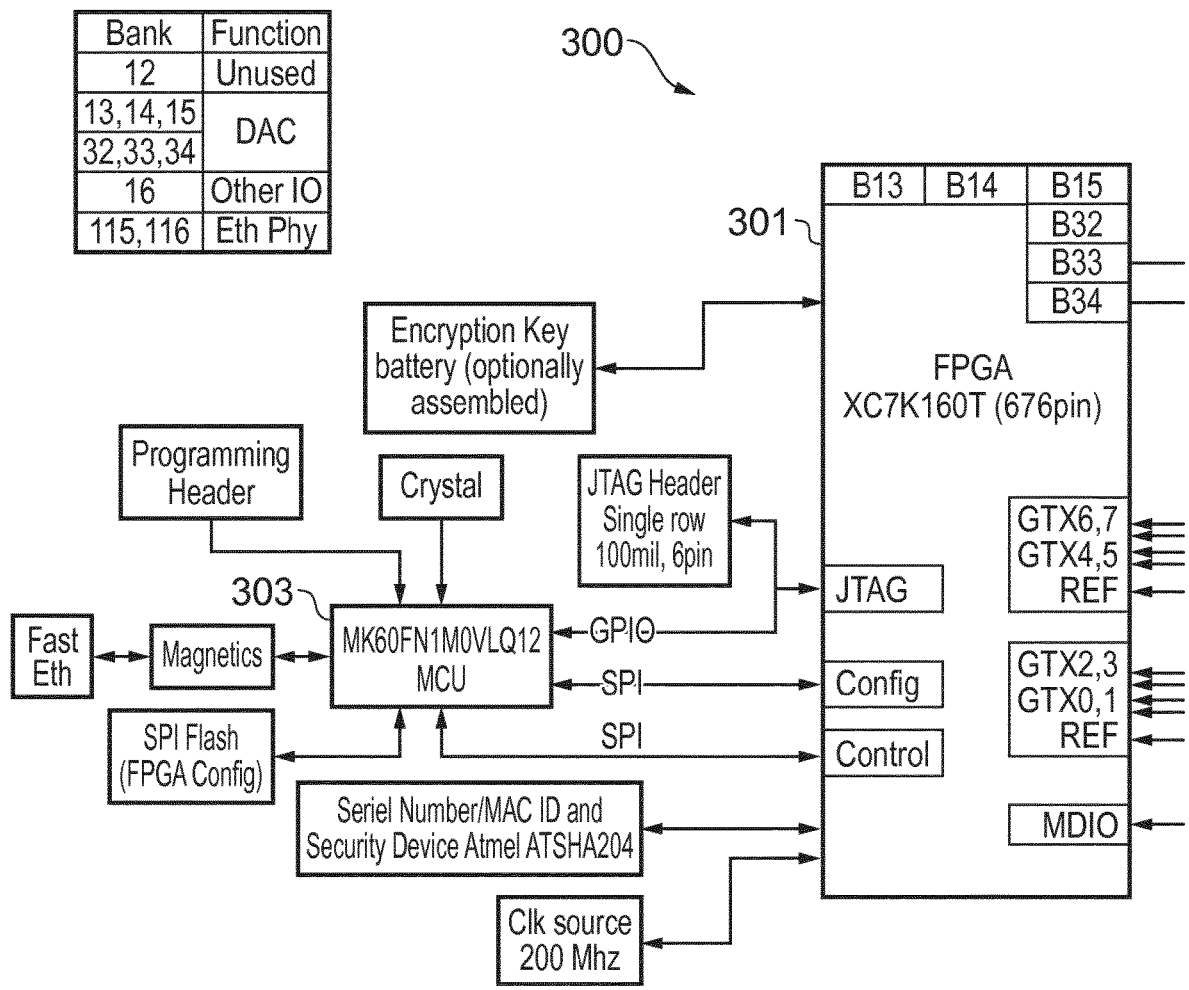
FIG. 3 is a structural diagram of an embodiment of a data sink node.
Figure 3:
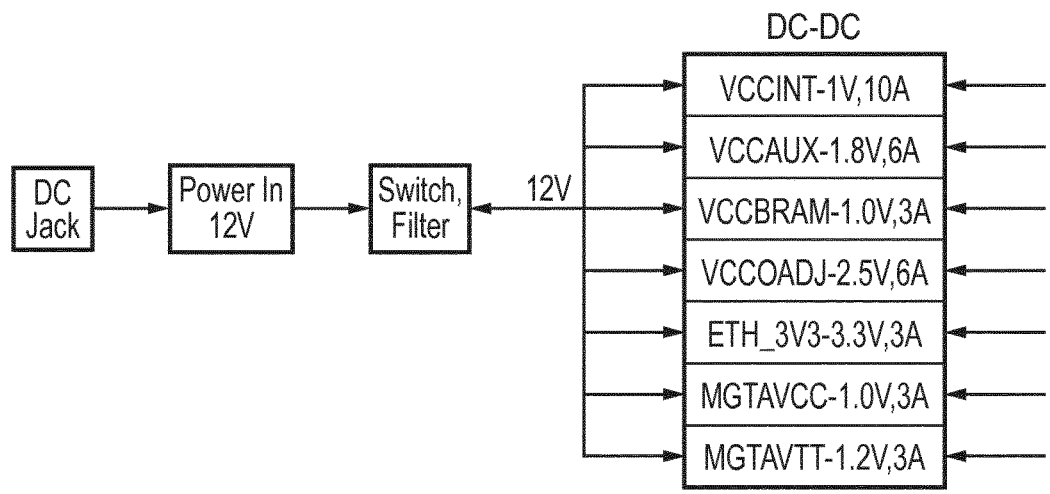
Figure 3:
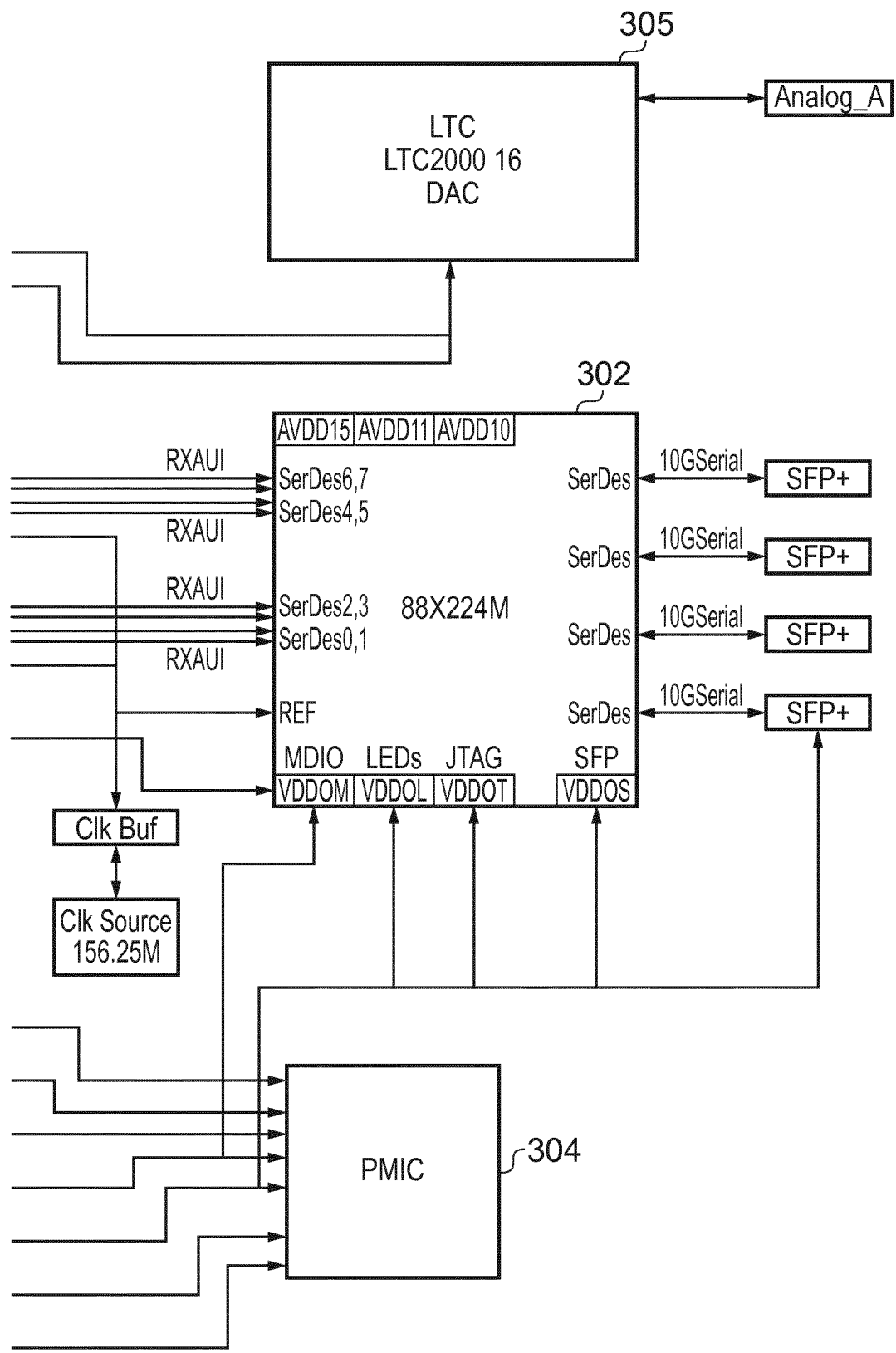

FIG. 3 shows the structure of a node 300 when it is being used as a data sink with a DAC 305. The node 300 has the same structure as shown in FIG. 1 and so the description of FIG. 1 is not repeated here. However, in addition, the node 300 also comprises a DAC 305 in connection with the FPGA 301.

The DAC 305 is preferably a Linear Technology Corporation® 16-bit 2.5 giga sample per second (2.5 GSps) DAC 305. More specifically, the DAC 305 is an LTC2000 16 DAC, although other DACs may be used.

Figure 4:
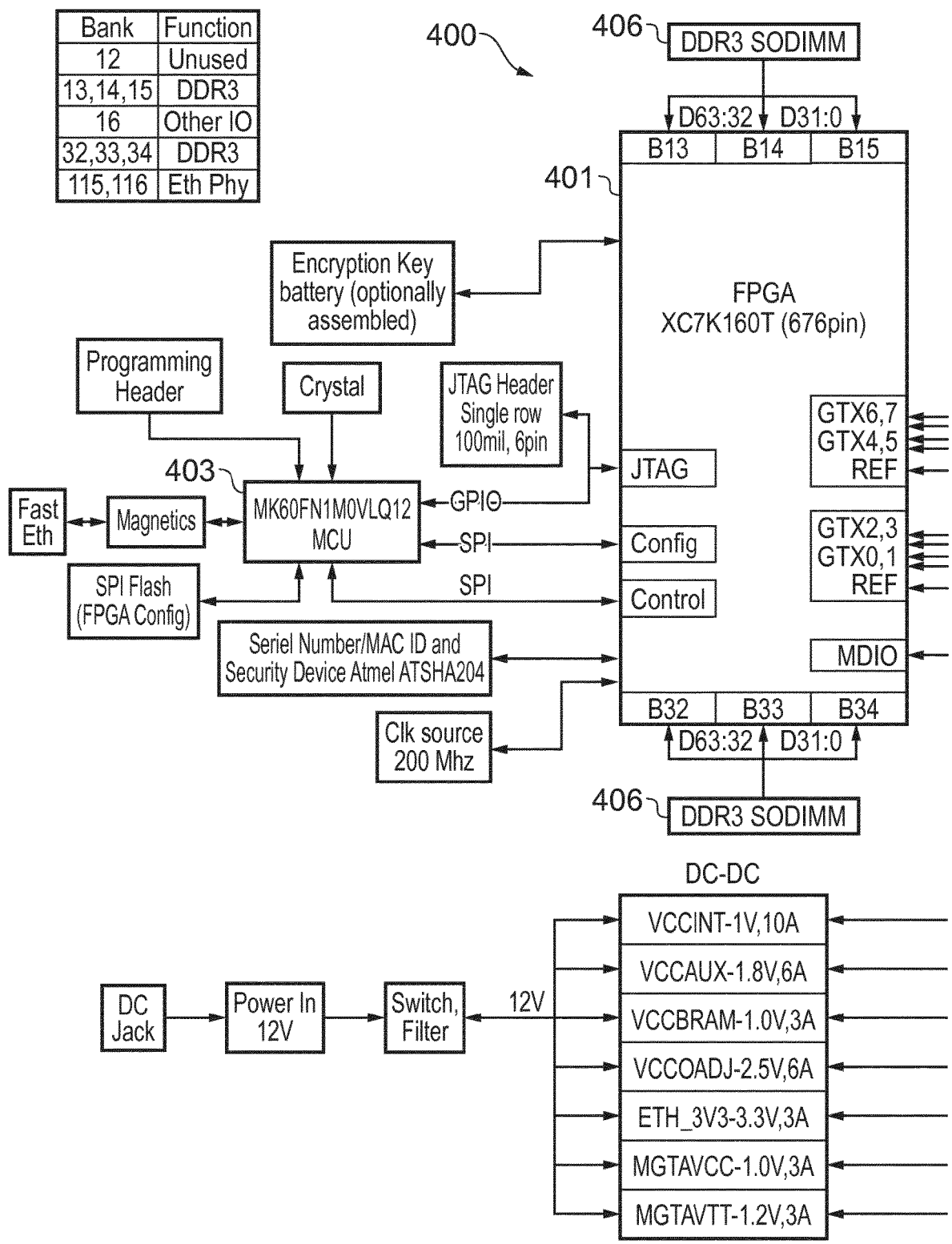
FIG. 4 is a structural diagram of an embodiment of a data sink/source node.
Figure 4:
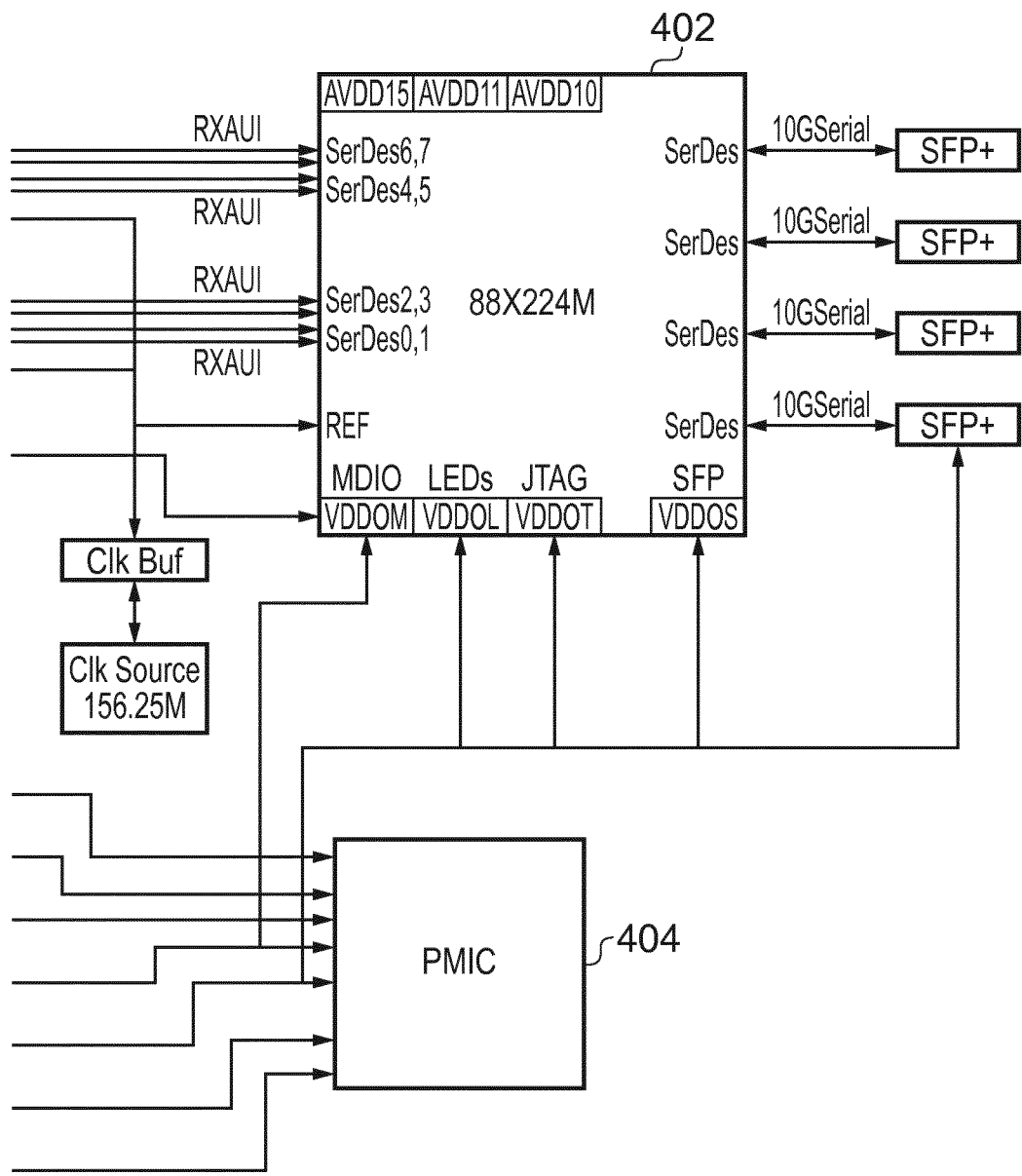

FIG. 4 shows the structure of a node 400 when it is being used as either a data source or a data sink, comprising discrete memory 406 for storage. The node 400 has the same structure as shown in FIG. 1 and so the description of FIG. 1 is not repeated here. However, in addition, the node 400 also comprises discrete memory 406 for data storage.

In a preferred embodiment, the discrete memory 406 is Double Data rate (DDR) synchronous dynamic random-access memory, attached to the node in small outline dual in-line memory modules (SO-DIMMs). More specifically, the memory 406 is a Double Data Rate type 3 (DDR3) SODIMM, as per JEDEC standard, module, although other types of memory, volatile and non-volatile may be used.

Figure 5:
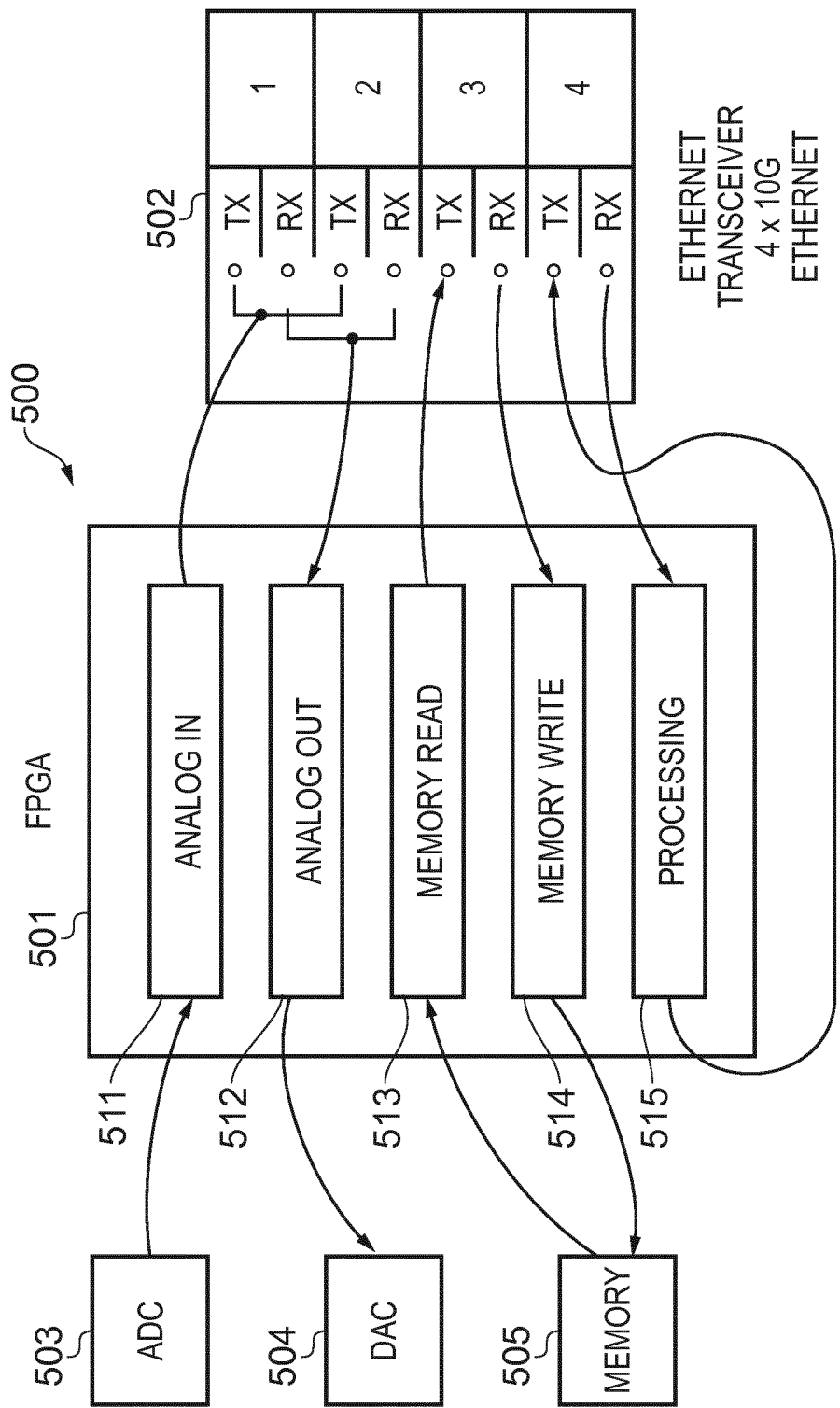
FIG. 5 is a drawing of the functional and physical configurations of a node.

FIG. 5 shows the physical and functional configurations of a node 500. The IP core of FPGA 501 of node 500 embodies one of five discrete functionalities of a node 500.

Specifically: analogue-in functionality 511, sampling analogue signals at the analogue front end of an ADC 503 and sourcing this data to the Ethernet network; analogue-out functionality 512, receiving (sinking) data from the Ethernet network and converting it to an analogue signal through a DAC 504; memory-read functionality 513, sourcing data to the Ethernet network by reading data from a discrete memory 505; memory-write functionality 514, receiving (sinking) data from the Ethernet network and storing it to the discrete memory 505; processing functionality 515, receiving data from the Ethernet network, processing the data and transmitting the now processed data back to the Ethernet network to be received by another node 100, 200, 300, 400, 500.

It is important to note that, at the time of scheduling a task and reserving any of the FPGA 501 exposed functionalities (511, 512, 513, 514, 515), in order to have this task executed, the interconnections between the discrete components (ADC 503, DAC 504, memory 505, Ethernet transceiver 502) and the FPGA 501 need to remain statically allocated, enabling a race-condition-free and direct-hardware-access path for the data between nodes/boards 100, 200, 300, 400, 500. For example, if a single port discrete memory is physically implementing the memory 505 of the node 500, and memory-read functionality 513 is reserved for a specific task, memory-write functionality 514 of the current node 500 should become unavailable for as long the memory is used for the memory-read 513 functionality. This ensures uninterrupted and direct access to the memory hardware for the data received for the memory-read functionality 513.

The present system architecture uses a single-input-single-output (SISO) approach, which extends throughout the node design, including the FPGA 501 internal IP cores. This greatly enhances porting application programming interfaces (APIs) in hardware, but also in developing software that executes on remote and abstracted hardware.

To properly limit each functional unit of an IP core to a single-input-single-output operation, care needs to be taken in handling external (to the FPGA 501) components, capable of operations both as inputs and outputs, such as discrete memory (capable of read/write functionalities) or Ethernet transceivers (capable of transmitting and receiving data). Discrete memory read actions should interconnect (through the FPGA 501) to the transmit end of an Ethernet port, while discrete memory write actions should interconnect (through the FPGA 501) to the receive end of the Ethernet port. ADCs 503 and DACs 504 should interconnect (through the FPGA 501) to the transmit and receive ends of the Ethernet port respectively.

Figure 6:
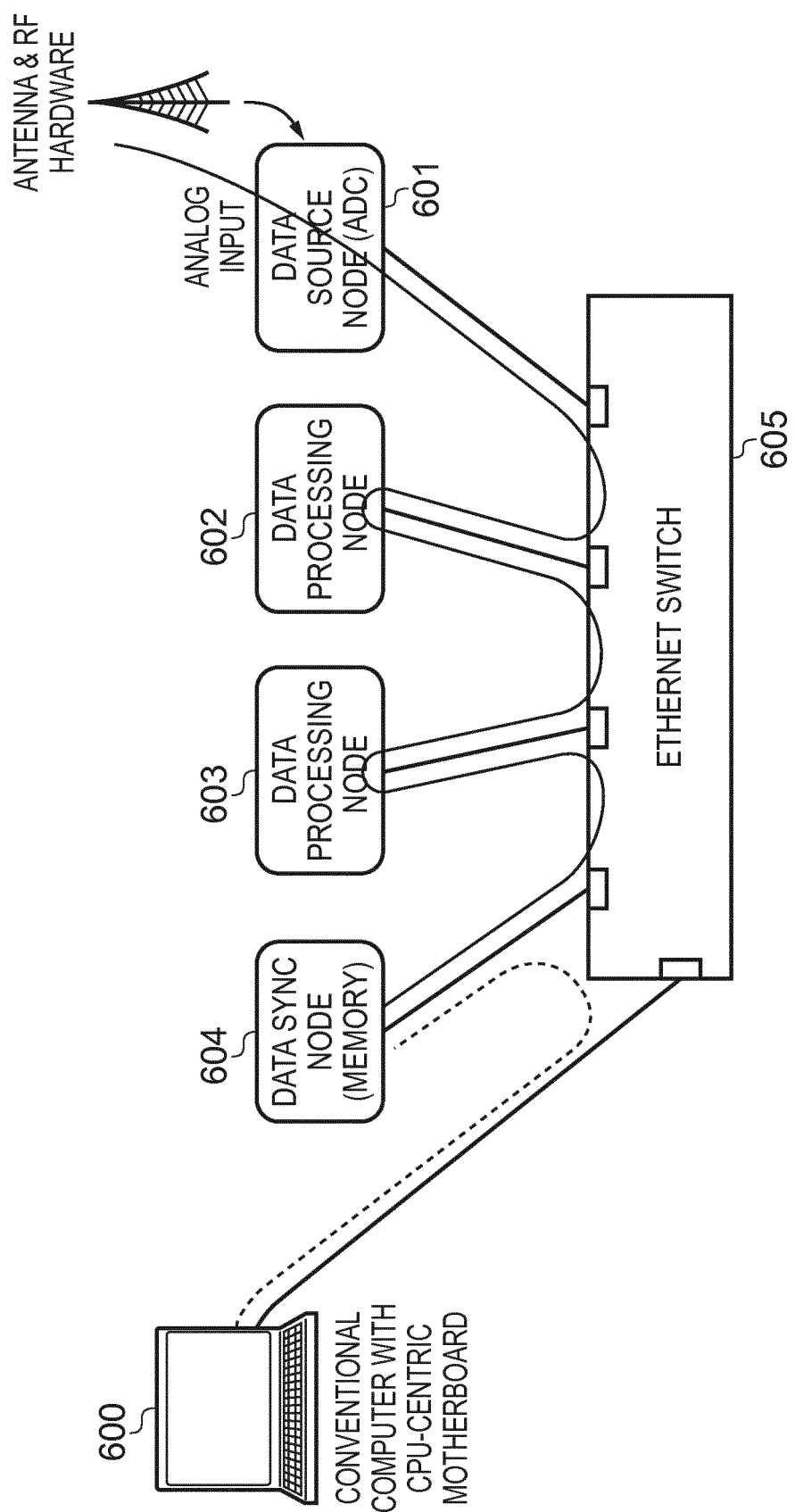
FIG. 6 shows an overview of the data processing method.

FIG. 6 shows an example of a data processing method of the present invention. A conventional (CPU-centric motherboard) computer 600, schedules offloading of a task, such as a task related to deploying a Software Defined Radio (SDR) LTE modem receiver. The conventional computer 600 discovers and reserves four nodes 601-604, loads the required IP cores to the nodes 601-604, assigning a unique role to each and interconnecting them. A data source node 601 offers access to a 5 GSps ADC, an antenna and RF hardware such that it may receive data for processing. The data source node 601 is interconnected to a first data processing node 602, the first data processing node 602 is interconnected to a second data processing node 603, the second data processing node 603 interconnects to a data sink 604, providing access to DDR3 memory. Each interconnection between the nodes 601-604, and hence between boards, passes through the Ethernet Switch 605. In this manner, data always travels, within the system, from a node/board, to the Ethernet switch 605, to another node/board, to the Ethernet switch 605 etc.

The conventional computer 600 triggers sampling of 15 GB worth of data from the data source node 601 at 5 Gsps/8-bit words (Sampling Duration:3 sec). The 5 GBps data stream generated by the data source node 601, passes through the first data processing node 602 where a DSP band-pass filter is applied to the (now digital) signal in order to extract a specific channel at 800−/+10 MHz out of the sampled data frequency spectrum. The first data processing node 602 now passes the processed (filtered) version of the data to the second processing node 603. The second processing node 603 implements (in its IP Core) a full SDR LTE stack consisting of units capable of carrying out: channelization and sample rate conversion, demodulation, framing, RS error correction and detection, decoding, descrambling and de-multiplexing, with all processing done in real time. Finally the processed data is passed from the second processing node 603 to the data sink node 604, to store in (DDR3) memory.

The conventional computer 600, can now treat the data sink node 604 as a data source and transfer the processed data to its own local memory (acting as data sink itself), using a network interface controller (NIC) that allows exclusive and direct access to the memory of the conventional computer 600.

Figures 7A, 7B, 7C:
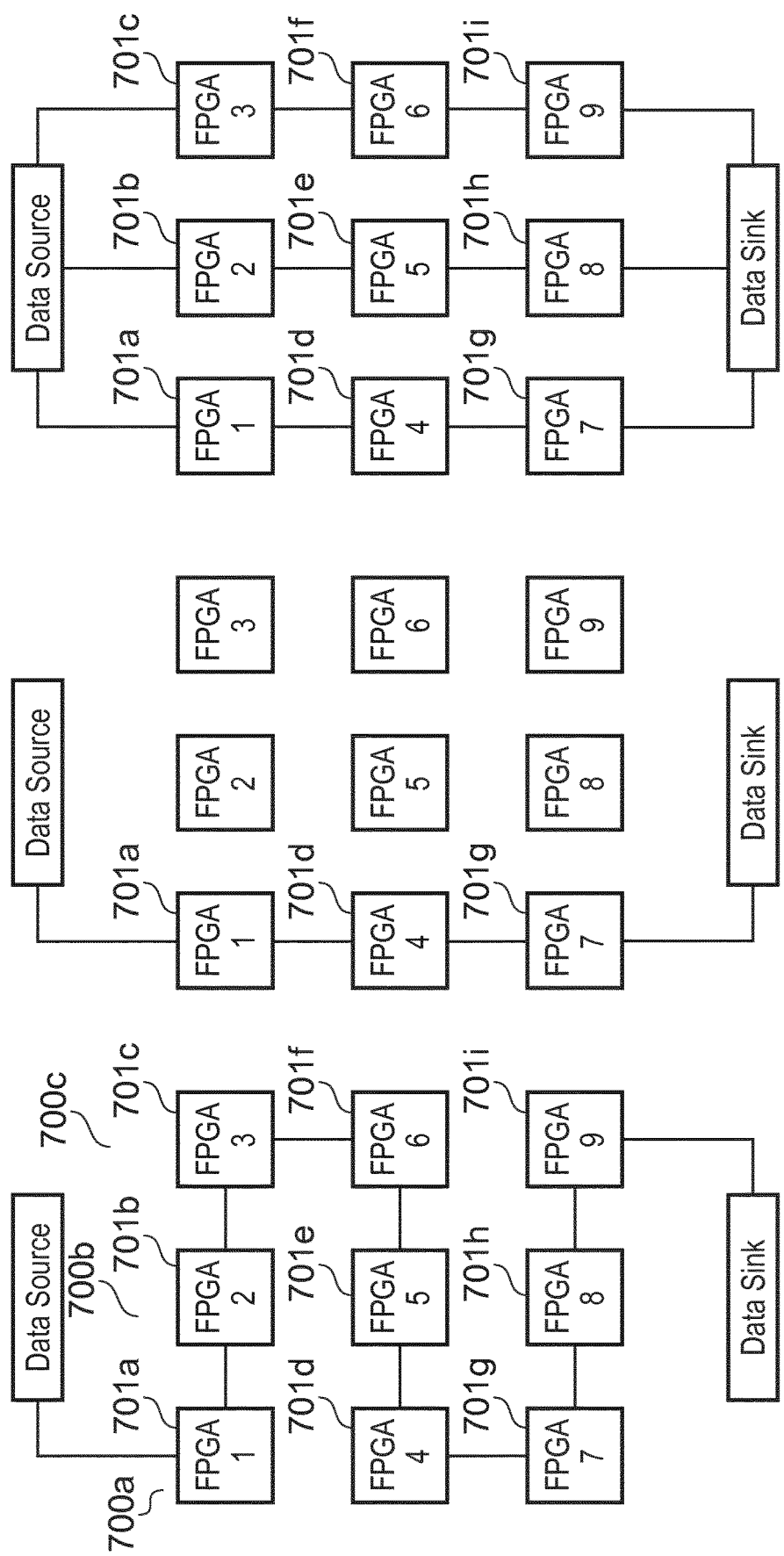
FIGS. 7a-c show alternate networking structures of the present invention.

FIGS. 7a-c show examples of alternative networking structures possible within a single system.

FIG. 7a shows a networking structure similar to the structure of FIG. 6, except with more nodes 700a-i comprising FPGAs 701a-i. In this simplified structure, the Ethernet switch is not shown, however, it is to be recognised that data being transferred between nodes 700a-i, and therefore boards, is transferred via an Ethernet switch. Data enters the system and is processed in series, by node 700a, then node 700b, then node 700c etc.

In FIG. 7b, only three nodes 700a, 700d, 700g are required to process the data. In this situation, the remaining nodes 700 are not activated, or, if they are already activated, are deactivated such that the power requirements of the system are minimised.

In FIG. 7c, it is determined that the data requires three processing operations, but unlike in FIG. 7b, it is determined that the nodes 100a-i are not capable of processing the data at a required speed. The data is consequently split into three portions, and distributed amongst the nodes 700a-i for processing in parallel, such that a first group of nodes 700a-c are all performing the same process on the data. In this manner, the first group of nodes 700a-c comprise the same IP cores, and therefore, can be considered to be identical. Similarly, a second group of nodes 700d-f can be considered identical to each other and a third group of nodes 700g-i can be considered identical to each other as they are performing the same process on different portions of the data.

The invention claimed is:

1. A method of processing data in a computer system, the method comprising the steps of:
   1) allocating at least one processing node (100);
   2) receiving data at a data source node (200, 400);
   3) transferring the data to the or each processing node (100) through a serial data connection;
   4) processing the data at the or each processing node (100); and
   5) transferring the processed data from the or each processing node (100) to a data sink node (300, 400) through the serial data connection,
   wherein the data is transferred and processed in a non-blocking architecture, and
   wherein:
      the data source node (200) comprises an analogue-to-digital converter (205) arranged to convert the data; or
      the data sink node (300) comprises a digital-to-analogue converter (305) arranged to convert the data.

2. The method of claim 1, wherein the data is transferred in a path which alternates between the serial data connection and the nodes (100, 200 300, 400).

3. The method of claim 1, wherein the data is granted a race-condition-free, direct-access path to the or each processing node (100), the data source node (200, 400) and the data sink node (300,400).

4. The method of claim 1, wherein the or each processing node (100) comprises a microcontroller (103).

5. The method of claim 4, wherein the microcontroller (103) comprises a serial data port.

6. The method of any of claim 1, wherein the data source node (200) comprises an analogue to digital converter (205) arranged to convert the data.

7. A node (100, 200, 300, 400), comprising:
   a Field Programmable Gate Array (101, 201, 301, 401), FPGA, or an Application Specific Integrated Circuit, ASIC;
   a serial data port; and a serial data transceiver (102, 202, 302, 402), forming a connection between the FPGA or ASIC (101, 201, 301, 401) and the serial data port, wherein the node (100, 200, 300, 400) is arranged to communicate with other devices through the serial data port, further wherein the node (100, 200, 300, 400) comprises no more than one FPGA (101, 201, 301, 401) or ASIC, wherein the node (100, 200, 300, 400) is further arranged to communicate with other devices using a non-blocking architecture, and wherein the node (200, 300) further comprises a digital-to-analogue converter (305) or an analogue-to-digital converter (205).

8. The node (100, 200, 300, 400) of claim 7, wherein the node (100, 200, 300, 400) is further granted a race-condition-free, direct-access path to the other devices.

9. The node (400) of claim 7, wherein the node (400) further comprises discrete memory (406).

10. The node (100, 200, 300, 400) of claim 7, wherein the node (100, 200, 300, 400) further comprises a microcontroller unit (103, 203, 303, 403).

11. The node (100, 200, 300, 400) of claim 10, wherein the microcontroller unit (103, 203, 303, 403) comprises a serial data port.

12. The node (100, 200, 300, 400) of claim 7, wherein the node (100, 200, 300, 400) further comprises a power management integrated circuit (104, 204, 304, 404).

13. A computer architecture system, comprising:
 a data source node (200, 400)
 a plurality of processing nodes (100); and
 a data sink node (300, 400),
wherein the plurality of processing nodes (100), the data source node (200, 400) and the data sink (300, 400) are arranged to communicate through a serial data connection and wherein the system is further arranged to perform the steps of:
 1) allocating at least one processing node (100);
 2) receiving data at the data source node (200, 400);
 3) transferring the data to the or each processing node (100) through the serial data connection;
 4) processing the data at the or each processing node (100); and
 5) transferring the processed data from the or each processing node (100) to the data sink (300, 400) through the serial data connection,
further wherein the plurality of processing nodes (100), the data source node (200, 400) and the data sink (300, 400) each comprise no more than one Field Programmable Gate Array (101) or Application Specific Integrated Circuit,
wherein the plurality of processing nodes (100), the data source node (200, 400) and the data sink node (300, 400) are further arranged to communicate as a non-blocking architecture, and wherein:
 the data sink node (300) comprises a digital-to-analogue converter (305); or
 the data source node (200) comprises an analogue-to-digital converter (205).

14. The system of claim 13, wherein the data is transferred in a path which alternates between the serial data connection and nodes (100, 200, 300, 400).

15. The computer architecture system of claim 13, wherein the plurality of processing nodes (100), the data source node (200, 400) and the data sink node (300, 400) are further arranged to communicate with a race-condition-free, direct-access path.

16. The computer architecture system of claim 13, wherein the data source node (400) and/or the data sink node (400) comprise discrete memory.

17. The computer architecture system of claim 13, wherein the plurality of processing nodes (100), the data source node (200, 400) and the data sink node (300, 400) comprise a microcontroller unit (103, 203, 303, 403).

18. The computer architecture system of claim 17, wherein the microcontroller unit (103, 203, 303, 403) comprises a serial data port.

19. The computer architecture system of claim 13, wherein the plurality of processing nodes (100), the data source node (200, 400) and the data sink node (300, 400) comprises a power management integrated circuit (104, 204, 304, 404).

20. The computer architecture system of claim 13, wherein the system further comprises a serial data switch (605).

* * * * *